United States Patent
Gokhman et al.

(10) Patent No.: US 11,580,232 B2
(45) Date of Patent: Feb. 14, 2023

(54) BUILDING A PACKAGE DEPENDENCIES DATA STRUCTURE

(71) Applicant: Snyk Ltd, London (GB)

(72) Inventors: Michael Gokhman, Ramat Gan (IL); Shaun Smith, London (GB); Assaf Hefetz, Holon (IL)

(73) Assignee: Snyk Limited, London (GB)

( * ) Notice: Subject to any disclaimer, the term of this patent is extended or adjusted under 35 U.S.C. 154(b) by 0 days.

(21) Appl. No.: 17/885,672

(22) Filed: Aug. 11, 2022

(65) Prior Publication Data

US 2022/0382882 A1 Dec. 1, 2022

Related U.S. Application Data

(62) Division of application No. 16/659,018, filed on Oct. 21, 2019.

(60) Provisional application No. 62/748,785, filed on Oct. 22, 2018.

(51) Int. Cl.
- *G06F 21/57* (2013.01)
- *G06F 16/901* (2019.01)
- *G06F 8/41* (2018.01)
- *G06F 8/36* (2018.01)

(52) U.S. Cl.
CPC .............. *G06F 21/577* (2013.01); *G06F 8/36* (2013.01); *G06F 8/433* (2013.01); *G06F 16/9027* (2019.01)

(58) Field of Classification Search
CPC ........ G06F 8/36; G06F 8/433; G06F 16/9027; G06F 21/577
See application file for complete search history.

(56) References Cited

U.S. PATENT DOCUMENTS

| | | | | |
|---|---|---|---|---|
| 8,516,443 | B2* | 8/2013 | Li | G06F 8/75 |
| | | | | 717/124 |
| 10,095,499 | B2* | 10/2018 | Gonzalez del Solar | G06F 8/36 |
| 10,877,746 | B2* | 12/2020 | Moondhra | G06F 16/22 |
| 2008/0270435 | A1* | 10/2008 | Furusho | G06F 16/9027 |
| | | | | 707/999.102 |
| 2009/0172636 | A1* | 7/2009 | Griffith | G06F 11/3664 |
| | | | | 717/113 |
| 2010/0083228 | A1* | 4/2010 | Branda | G06F 11/3612 |
| | | | | 717/120 |
| 2012/0102029 | A1* | 4/2012 | Larson | G06F 8/34 |
| | | | | 707/736 |
| 2012/0304153 | A1* | 11/2012 | Li | G06F 8/75 |
| | | | | 717/123 |
| 2013/0268258 | A1* | 10/2013 | Patrudu | G06F 40/40 |
| | | | | 704/9 |
| 2015/0220315 | A1* | 8/2015 | Chiba | G06F 8/40 |
| | | | | 717/149 |

(Continued)

*Primary Examiner* — Douglas M Slachta
(74) *Attorney, Agent, or Firm* — Robert Goozner

(57) ABSTRACT

A system, product and process for building a package dependencies data structure. The method comprises determining a package instance identifier of the package to be processed. The package instance identifier is determined based on a unique identifier of the package to be processed and based on a unique identifier of a dependency sub-tree of the package to be processed in the package instance identifier. The package instance identifier is utilized to determine if a node representing the package to be processed exists or not. In case the node does not exist already in the data structure, the node is created and added.

18 Claims, 6 Drawing Sheets

(56) References Cited

U.S. PATENT DOCUMENTS

| | | | |
|---|---|---|---|
| 2017/0046138 A1* | 2/2017 | Stanfill | G06F 8/40 |
| 2018/0067980 A1* | 3/2018 | Suri | G06F 9/5066 |
| 2020/0004528 A1* | 1/2020 | Pape | G06F 8/65 |

* cited by examiner

GA REF: 504-2.2US

HIGH SEVERITY

● PROTOTYPE OVERRIDE PROTECTION BYPASS
vulnerable module: qs ←510
introduced through: tap@5.8.0, express@4.12.4 and others ←515

🔧 fix this vulnerability
detailed paths and remediation

- introduced through: goof@0.0.4>codecov.io@0.16>request@2.42.0>qs@1.2.2 ←522a
  remediation: no remediation path available. ←522b
- introduced through: goof@0.04>express@4.12.4>qs@2.4.2 ←524a
  remediation: upgrade to express@4.15.2. ←524b
- introduced through: goof@0.04>bode-parser@1.9.0>qs@2.2.4
  remediation: upgrade body-parser@1.17.1 overview 530
520

FIG.5A

× high severity vulnerability found in negotiator
description: regular expression denial of service (dos)
info: https://snyk.io/vuln/npm:negotiator:20160616
introduced through: errorhandler@1.2.0, express@4.12.4, st@0.2.4
from: errorhandler@1.2.0>accepts@1.1.4>negotiator@0.4.9
from: express@4.12.4>accepts@1.2.13>negotiator@0.5.3
from: st@0.2.4>negotiator@0.2.8
remediation:
  upgrade direct dependency errorhandler@1.2.0 to errorhandler@1.4.3 (triggers upgrades to errorhandler@1.4.3>accepts@1.3.3>negotiator@0.6.1)
  upgrade direct dependency express@4.12.4 to express@4.14.0 (triggers upgrades to express@4.14.0>accepts@1.3.3 > negotiator@0.6.1)
  upgrade direct dependency st@0.2.4 to st@1.1.0 (triggers to st@1.1.0>negotiator@0.6.1)

BUILDING A PACKAGE DEPENDENCIES DATA STRUCTURE

CROSS-REFERENCE TO RELATED APPLICATION

This application is a divisional application and claims the benefit of U.S. patent application Ser. No. 16/659,018 entitled PACKAGE DEPENDENCIES REPRESENTATION, filed Oct. 21, 2019, which claims the benefit of U.S. Provisional Application No. 62/748,785 filed Oct. 22, 2018, entitled "PACKAGE DEPENDENCIES REPRESENTATION", all of which are hereby incorporated by reference in their entirety without giving rise to disavowment.

TECHNICAL FIELD

The present disclosure relates to software engineering in general, and to code dependencies in software products, in particular.

BACKGROUND

Applications today contain many third party components. Code dependencies are pulled down from publicly available repositories that are associated with a programing language, a build system, or the like.

In some exemplary embodiments, code repositories may be typically focused on a specific programming language or runtime platform. Additionally or alternatively, the code repositories may be entirely dedicated to a specific programming language or runtime platform. As non-limiting example, Node Package Manager™ (NPM), may hold code packages written in JavaScript™ and consumed by applications running in a browser or on the Node.js™ runtime. As another non-limiting example, the RubyGems may hold code packages, known as Gems, written in Ruby™ and consumed by Ruby applications. Yet, another non-limiting example, Maven™, the veteran code package repository, may hold packages meant to be executed on the Java™ Virtual Machine (JVM), written primarily in Java™ and more recently in Scala™. As another non-limiting example, Docker images have image repositories, where each image is being built from multiple images as dependencies and each image contains the operating system binaries as dependencies.

In some exemplary embodiments, code packages may help programmers develop software faster by sparing them the need to create functionality that other developers have already implemented. Instead of writing such functionality, a developer may state the package she needs and may have it available as a library or module in her code. The sizes of the packages may vary. Some packages may be extremely big, such as providing the functionality of a full web servers (e.g. Express.js™). In other cases, the packages may be extremely small, such as a package providing the functionality of padding zeros to an integer (e.g. left-pad).

Additionally or alternatively, code packages, similarly to binaries, may often have dependencies of their own. The dependencies may be used by the developers of the package to get the same efficiencies mentioned above. As a result, consuming a single code package may in fact mean consuming many more, at times dozens, hundreds, thousands, or the like, of packages with it. Each programming language, runtime and package manager may handle the management of these direct and indirect dependencies differently. However, the concept of these recursive dependencies may exist in all.

In some exemplary embodiments, code packages may be a software, and accordingly may have bugs, such as but not limited to, security bugs and exhibit vulnerabilities which may be utilized by malicious users.

In some exemplary embodiments, code packages may be subject to different legal arrangements, such as different open source licenses (e.g., GPL™, MPL™, BSD™, or the like), different proprietary licenses, or the like.

It is noted that the term code generally refers to software in any form, such as but not limited to source code, software in binary form, open source software, software package, software binaries, or the like.

BRIEF SUMMARY

One exemplary embodiment of the disclosed subject matter is a data structure retained on a non-transitory computer readable medium, the data structure representing package dependencies in a computer program, wherein the data structure comprising: a set of package instance nodes, wherein each package instance node represents a different instance of a code package, wherein each package instance node comprising a package instance identifier and an instance metadata, wherein the package instance identifier is a unique identifier in the set of package instance nodes, wherein the instance metadata comprise a reference to a package record, wherein the package record representing a package, wherein the instance package is an instance of the package; wherein the set of package instance nodes comprise at least two package instance nodes that represent different instances of a same package; a set of edges connecting package instance nodes of the set of package instance nodes, wherein an edge from a source node to a target node represents a dependency relationship of a package represented by the source node on a package represented by the target node; and wherein the data structure forming a directed acyclic graph representing a package dependency tree.

Optionally, the package instance identifier of a package instance node that has one or more children nodes is computed based on package instance identifiers of the one or more children nodes.

Optionally, the package instance identifier is determined based on a sub-tree identifier, wherein the sub-tree identifier is computed using a hash function and based on a predetermined order between the one or more children nodes, whereby the sub-tree identifier is consistent and useful for deduplication.

Optionally, the predetermined order is irrespective of irrespective of the manner in which the computer program was written.

Optionally, the instance metadata comprise information relating to package provenance, wherein the package record comprise information regarding at least one of: location of the package, a maintainer of the package, a description of the package, and one or more keywords related to the package.

Another exemplary embodiment of the disclosed subject matter is a method for identifying all package instances of a target package in the data structure representing package dependencies in a computer program, the method comprising: obtaining a package record of the target package; and traversing connections in the package record to reach all package instance nodes in the set of package instance node that are connected to the package record; whereby said identifying is performed in a constant time complexity.

Yet another exemplary embodiment of the disclosed subject matter is a method for identifying dependency paths to a target package instance in the data structure representing package dependencies in a computer program, the method comprising: obtaining a package instance node of the target package instance in the set of package instance nodes; and traversing the directed acyclic graph in a reverse direction, beginning at the package instance node of the target package instance, until reaching a root node of the directed acyclic graph representing a user code, whereby each traversal path is a different dependency path of the target package instance.

Yet another exemplary embodiment of the disclosed subject matter is a method comprising: obtaining, in a constant time complexity, all package node instances of a target package in the set of package node instances; for each package node instance of the target package, identifying dependency paths to the target package node instance, whereby identifying all dependency paths to all instances of the target package within the data structure representing package dependencies in a computer program.

Optionally, the target package is a package having a vulnerability according to a flaws database, wherein the method further comprises: determining a potential mitigation action for the vulnerability and providing a suggestion to perform the potential mitigation action in order to remove the vulnerability, wherein the suggestion is potentially different for different dependency paths.

Yet another exemplary embodiment of the disclosed subject matter is a method comprising obtaining the data structure representing package dependencies in a computer program, wherein the package record comprises license information of the package represented by the package record; determining one or more licenses governing over the computer program or portion thereof; and outputting an indication of the one or more licenses to a user.

Yet another exemplary embodiment of the disclosed subject matter is a method comprising obtaining the data structure representing package dependencies in a computer program, wherein the data structure providing an implicit representation of the package dependency tree that is smaller, in size, than an explicit representation of the package dependency tree; loading the data structure to a memory region of a process, wherein the explicit representation of the package dependency tree exceeds a threshold of data structures that can be retained within in-process memory; and processing, by the process, the data structure.

Optionally, said obtaining comprises receiving, by an end-device, the data structure from a server, wherein the process is executed by the end-device.

Optionally, the process is executed on a client device without relaying on connectivity to a server.

Yet another exemplary embodiment of the disclosed subject matter is a computer program product comprising a non-transitory computer readable storage medium retaining program instructions, which program instructions when read by a processor, cause the processor to perform a method for building the data structure representing package dependencies in a computer program, the method comprising, repeatedly performing for a package to be processed: determining a package instance identifier of the package to be processed, wherein said determining the package instance identifier comprises: obtaining a unique identifier of the package to be processed; obtaining a unique identifier of a dependency sub-tree of the package to be processed in the package instance identifier; and determining the package instance identifier based on the unique identifier of the package to be processed and on the unique identifier of a dependency sub-tree of the package to be processed; in response to a determination that the set of package instance nodes does not comprise a node representing the package to be processed, creating the node and adding the node to the set of package instance nodes, wherein the determination whether the set of package instance nodes comprises the node is performed using the package instance identifier; and in case that the dependency sub-tree of the package to be processed is not empty, adding to the set of edges one or more edges representing dependency relationship between the node representing the package to be processed and one or more nodes in the dependency sub-tree of the package to be processed.

Optionally, said obtaining the unique identifier of the dependency sub-tree of the package to be processed comprises: obtaining a package instance identifier of each package on which the package to be processed directly depends, whereby obtaining a list of package instance identifiers representing the dependency sub-tree; and computing a hash value on the list of package instance identifiers representing the dependency sub-tree to obtain the unique identifier of the dependency sub-tree.

Optionally, an empty dependency sub-tree has a constant predetermined identifier.

Optionally, the method further comprises: selecting a translator to simulate a package manager that is applied on the computer program; and utilizing the translator to determine one or more direct dependencies of the package to be processed.

Optionally, the method further comprises: in response to said creating the node, determining whether a package record for the package to be processed exists; in response to a determination that the package record for the package to be processed does not exist, creating the package record and retaining metadata information regarding the package to be processed that is consistent for different instances thereof in the package record; connecting the node to the package record; and retaining in the node metadata information that is potentially inconsistent for different instances of the package to be processed.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 5A shows an illustration of a user interface, in accordance with some exemplary embodiments of the subject matter;

FIG. 5B shows an illustration of a user interface, in accordance with some exemplary embodiments of the subject matter.

DETAILED DESCRIPTION

Figure 1:
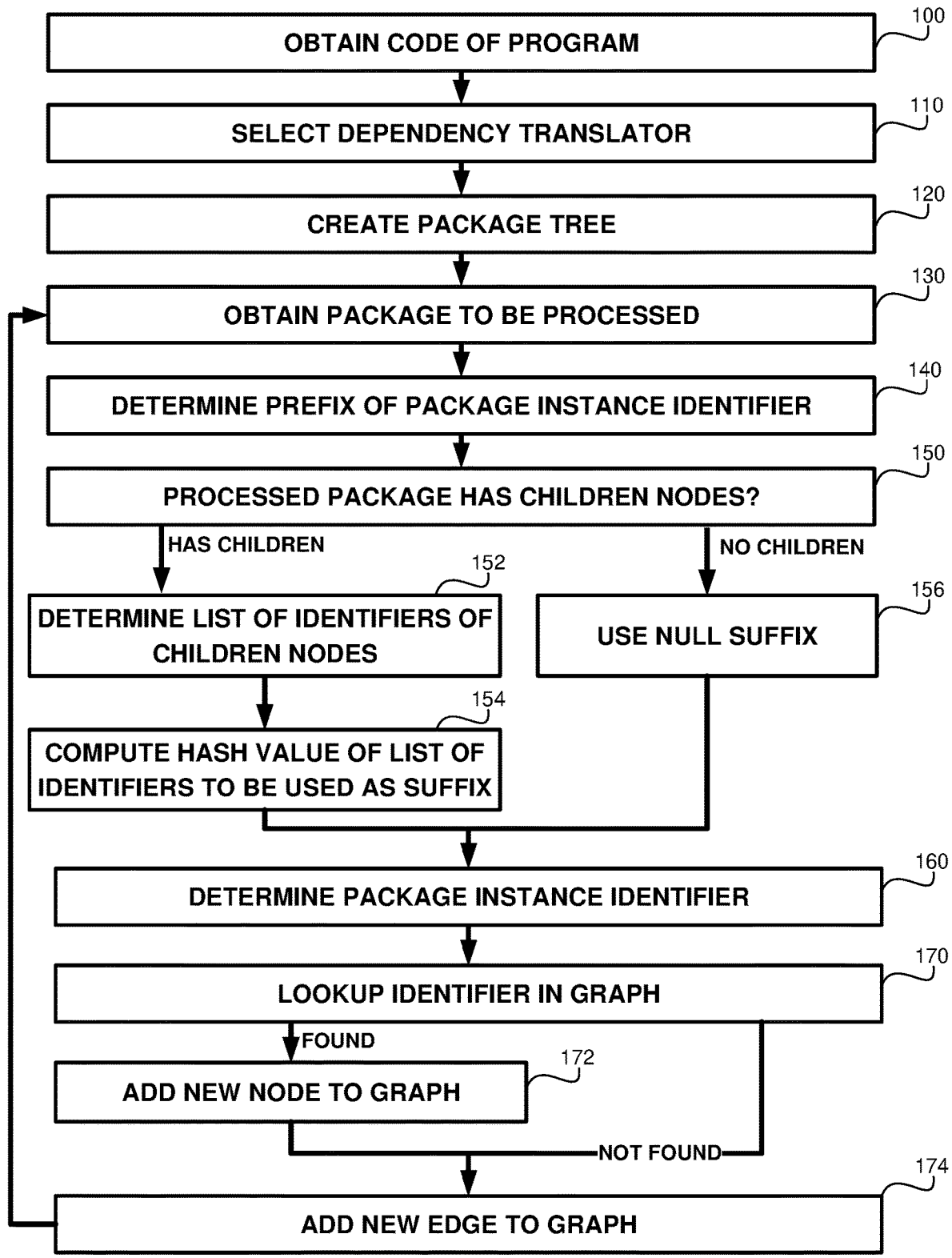
FIG. 1 shows a flowchart diagram of a method, in accordance with some exemplary embodiments of the disclosed subject matter.

In some exemplary embodiments, the code dependencies may be represented by a tree data structure. A tree data structure that may represent a hierarchical structure, with a root value and subtrees of children with a parent node, represented as a set of linked nodes. A tree data structure may be defined recursively as a collection of nodes, starting at a root node, where each node is a data structure consisting of a value, together with a list of references to nodes, the children, with the constraints that no reference is duplicated. In some exemplary embodiments, the software that is being written by the developer may be the root of the tree and each package may be a node in the tree.

The trees that represent dependencies may become much larger and exponential with the growth in the amount of packages usage. There are many cases where building and representing a reliable dependencies tree can take hundreds of Mega Bytes (MB) and in some exemplary embodiments even a few Giga Bytes (GB).

Representing the tree in a unified way may be complex as each ecosystem may have its own constraints. As an example, NPM may employ a deduping mechanism which may use the same NPM package across all dependencies that require it if the semantic versioning range is suitable. As another example, Maven may use dependencies exclusion, in which unwanted indirect dependencies may be excluded. As another example, Ruby has global constraints, which affect the final version of the resolved dependency.

One technical problem dealt with by the disclosed subject matter is to provide an efficient data structure that can efficiently represent the package dependencies in an accurate manner. It is noted that the same package (e.g., same package name and version) may yield in certain cases a different dependencies sub-tree, such as due to optimizations and due to constraints defined and which the ecosystem enforces. As a result, not all identical packages can be deduplicated and represented using a single node.

Another technical problem dealt with by the disclosed subject matter is allowing a method which may use less processing resources, less memory resources, less bandwidth or the like, when building package dependencies data structure, or when using such data structure.

Yet another technical problem is to enable client-side processing of package dependencies. In some cases, querying the package dependencies data structure on the client-side may provide significant advantages, such as relating to privacy, efficiency and operability in limited network connectivity. However, the client-side device may have limited storage, limited computation capabilities, or the like. As a result, a large data structure may create a technical challenge in digesting of the data, applying queries, and even storing it on the client-side device.

One technical solution is to build a graph in which the nodes may represent package instances rather than packages. A package instance may be an instantiation of a package. Each instantiation may have a different package dependencies subtree than other instantiations of the same package.

In some exemplary embodiments, a node in the graph may represent a package instance, also referred to as an instance. Such a node may comprise a package instance identifier that is used for deduplication. The package instance identifier may be a unique identifier, which differentiates different instances of the same package from one another. The package instance identifier may comprise or be determined based on the name of the package, the version, and a subtree identifier that is based on the package dependencies subtree of the package instances. The subtree identifier may be computed, for example, using a hash function on the identifiers of the direct descendants of the package-instance. In order to ensure a consistent subtree identifier, the hash value may be computed based on a sorted list of the direct descendants that are sorted based on their identifiers. Using a sorted list ensures that the same hash value will be provided for the same subtree, regardless of the order of the nodes. In case there are no direct descendants, i.e. there are no dependencies, the subtree identifier may be a predetermined NULL value.

In some exemplary embodiments, metadata comprising information relating to package provenance, such as reasons of what caused the package manager to resolve the dependency using the specific version of a package, may be computed and retained. In some exemplary embodiments, the metadata may be retained for each occurrence of the instance, as each occurrence may have a different package provenance leading to the resolution of the package dependencies to be the package instance. In some exemplary embodiments, the metadata may be retained in the node, such as in a list of metadata, each of which relating to a different occurrence. Additionally or alternatively, the graph may comprise package nodes each of which representing a package. Each occurrence of an instance may be represented by an edge from the package node to the instance node. The metadata may be retained in the edge. Additionally or alternatively, the metadata may be retained in a location external to the graph. Additionally or alternatively, metadata relating to the package which is identical to all instances may be retained in the package node. For example, the package node may comprise a Uniform Resource Locator (URL) pointing to the location of the package (e.g., a package repository location, such as in GitHub™ or other collaborative version control systems). Additionally or alternatively, the package node may comprise an indication of the maintainer of the package, package description, keywords related to the package, license information of the package, or the like. It is noted that the package node may represent a specific version of a package and package information, such as maintainer and license information, may change between one version and another.

In some exemplary embodiments, a new graph for representing dependencies may be built. The graph may be a package-instance graph. In some exemplary embodiments, the graph may be constructed based on a package tree. A new package-instance graph may be created, having no nodes and edges. The package tree may be traversed to determine how to construct the package-instance graph. In some exemplary embodiments, the package tree may be traversed recursively, starting from the root node. In some exemplary embodiments, prior to processing a node of the package tree, it may be required that all of its children may already have been processed.

In some exemplary embodiments, a processed tree node is obtained. Based on the processed tree node, a package instance identifier may be determined. The package instance identifier may be determined based on a package name and version, which may be comprised by the processed tree node. In addition, the package instance identifier may be based on a subtree identifier. The subtree identifier may be computed, for example, using a hash function on the identifiers of the direct descendants of the package-instance. It is noted that the direct descendants may already exist in the package instance graph as the children of the processed tree node have already been processed. As an example, consider a tree node for package "a", version 1.1, referred simply as a@1.1 having two children nodes in the package tree, son1@1.0, son2@1.0. The children nodes may correspond package instances having the following package instance identifiers: "son1@1.0, leaf", "son2@1.0, 1222fa000ab". The package instance identifier that is created may be "a@1.1, f21234fddde", where f21234fddde is a hash value returned for the string that comprises the package instance identifiers of the direct descendants in an ordered manner (i.e., "son1@1.0, leaf;son2@1.0, 1222fa000ab"). It is noted that if there are no direct descendants, instead of computing a hash value, a NULL value, such as "leaf" may be used. Additionally or alternatively, the hash function may be applied on an empty string or other NULL value representation to obtain the predetermined NULL value.

The determined package instance identifier may be used to lookup a node having the package instance identifier in the package instance graph. If the node exists, it may be obtained and used without creating an additional node, hence achieving deduplication. If the node does not exist, it may be created and added to the list of nodes in the graph. In case the node is created, edges connecting the node with nodes of each package-instance corresponding the direct descendants of the tree node may be added.

In case the node was created, it may be connected to a representation of the package. The connection may enable obtaining from a package representation a package instance of the package, in constant time complexity (O(1)). In some exemplary embodiments, the package-instance graph may also comprise nodes that represent a package, in addition to the nodes that represent package-instances. Each package node may be connected to at least one package-instance node, such as showing that the package instance is an instance of that package. Additionally or alternatively, there may be another data structure which may hold a list of all the packages and where each package may be connected to a package-instance node in the graph, showing the relationship between the package and the package-instance. In some exemplary embodiments, determining all instances of a package may be performed in constant time complexity (e.g., O(1)) irrespective to the number of other packages or instances thereof.

In some exemplary embodiments, what caused the specific package version to be selected or the specific package instance to be created, may be determined and stored as metadata in the package representation, in the package instance node, in an edge connecting them, or in another location. The information relating to the package provenance may be useful if vulnerability remediation (i.e., automated fix of manifest file or automatically generated fix guidance) is required and a different version is desired. The package provenance information may be useful in directing the user as to how to remediate the problem and change the version of the package, or change the package instance (e.g., an instance using different package versions of its dependencies or including only a portion of the dependencies). Additionally or alternatively, the package provenance information may be useful for automatic remediation.

In some exemplary embodiments, the package tree may be spawned by different package managers. Each package manager may create a different package tree for the same code. In order to cope with the non-uniform package trees which may represent the same code in different manners, a layer of translators may be implemented. Each translator may simulate an operation of a corresponding package manager in spawning a package tree for a source code, a package, a program, or the like. The disclosed subject matter may identify which package manager is utilized and employ a corresponding translator so as to provide an accurate package instance graph.

In some exemplary embodiments, the package tree may require a large amount of memory and may not be suitable to be retained by a process in general or in a client-machine. In some cases, it may impractical for a process to retain the entire tree. The building of the graph may be performed by handling portions of the tree independently, and flushing the portion of the tree that was processed before moving on to the next portion. For example, the tree may be divided into subtrees, each of which may be processed separately while adding information to the same package-instance graph.

One technical effect of utilizing the disclosed subject matter is that the complete dependency graph may be more compact. In some exemplary embodiments, as a result of the reduced size of the dependencies graph, it may be able to build and query the dependencies graph on the client side, reducing traffic to a backend server and enabling shorter response time between the user's queries and providing a responses thereto. Additionally, or alternatively, maintaining a large package tree may be hard. Compacting the representation may reduce the complexity of the maintenance task.

In some exemplary embodiments, all instances of a specific package across the graph may be retrieved in a constant time complexity (e.g., O(1)), such as by traversing the connections of the package representation to each package instance node connected thereto. Additionally or alternatively, retrieval information about a package may be obtained from a package instance node in constant time complexity (e.g., O(1)). For example, the package name and version may be obtained from the package instance identifier (e.g., a prefix thereof) and used to perform a lookup to obtain the package representation, such as using a dictionary data structure. Additionally or alternatively, the connection between the package representation and the package instance node may be bi-directional and may be traversed to obtain the package representation and information thereof.

In some exemplary embodiments, the package instance graph may be processed accurately to provide an accurate depiction of the dependency tree regardless of non-uniform processing of different ecosystems such as NPM, Ruby, Maven, Docker, or the like.

In some exemplary embodiments, an explicit representation of a package dependency tree (e.g., a full-fledged tree, without deduplication) may be too large to be retained in whole within in-process memory. In some cases, there may be a size threshold for objects to be retained in the in-process memory. The threshold may be feasibility threshold, exceeding which is impossible. Additionally, or alternatively, the threshold may be a practical threshold, which, when exceeded, the process may exhibit delays that exceed acceptable thresholds by users. In accordance with the disclosed subject matter, a representation of the tree, which could not have been retained in the in-process memory previously, can now be retained using a data structure in accordance with the disclosed subject matter. As an example, the threshold may be about 512 MB, 1 GB, about 4 GB, about 128 GB, or the like. The disclosed subject matter provides a manner of compacting the size of the representation of the dependency tree without introducing inaccuracy.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a flowchart of a method of building a package-instance graph, in accordance with some exemplary embodiments of the disclosed subject matter.

On Step 100, a code of a program is obtained. The code may include dependencies, inclusions, or other instructions that create package dependency. In some exemplary embodiments, the code may be in source code form, intermediate form (e.g., JAVA™ bytecode), binary form, or the like.

On Step 110, a translator for spawning the package tree may be determined. The translator may be selected from a pre-existing set of translators, each of which simulating the operation of a different package manager, such as Maven, NPM, or the like. The translator may be selected to simulate the operation of the package manager that would be applied on the source code.

On Step 120, apply translator to create the package tree. In some cases, the package tree may be created in-memory and in a partial manner. In some exemplary embodiments, the full representation of the package tree may exceed available memory resources, storage resources, or the like. In some exemplary embodiments, the package tree may be created in accordance with a predetermined order, such as in a Depth First Search in a post-order traversal. In some exemplary embodiments, patches of the full tree may be processed separately to allow for the processing to be performed in a processing environment having limited memory. In some exemplary embodiments, the children nodes of a node may have a pre-defined order that is irrespective of the manner in which the code was written. For example, the order between packages A and B and children nodes of a package may be the same irrespective of whether the instruction to include package A appears before or after the instruction to include package B. In some exemplary embodiments, the pre-defined order may be an alphabetical order of the package names (e.g., package A is ordered before package B). Additionally, or alternatively, the pre-defined order may be based on any metadata of the packages themselves, such as owner of the package, version number, creation date, or the like.

On Step 130, a package to be processed may be obtained. The package to be processed may be a package to be added to the package-instance graph. The package to be processed may be a package that the source code depends on. In some exemplary embodiments, it may be desired to determine a package instance identifier of the package. The package instance identifier may be utilized to implement deduplication of identical package instances and to differentiate between different instances of the same package.

On Step 140, a prefix of the package instance identifier may be determined. The prefix may be composed of the package name, the version of the package, or the like. As an example, the prefix of version 1.1 of package "a" may be "a@1.1". It is noted that in some embodiments, instead of a prefix, another portion of the identifier, such as suffix, middle-portion, or the like, may be determined based on the metadata of the package itself. For the clarity of the description and without limiting the disclosed subject matter to a specific embodiment, the specification describes an embodiment where the prefix is based on the package metadata and the suffix is based on information regarding the sub-tree of packages on which the package depends.

On Step 150, it may be determined if the package to be processed has children nodes. If there are children nodes, Step 152 may be performed. Otherwise, Step 156 may be performed.

On Step 152, a list of package instance identifiers of the children nodes may be obtained. The list of the package identifiers may be ordered in accordance with the pre-defined order of the packages. As an example, if the version 1.1 of package "a" has two children nodes—version 1.0 of "son1", and version 1.0 of "son2"—the package instance identifiers of those instances may be obtained (e.g., "son1@1.0, leaf", "son2@1.0, 1222fa000ab"). In some exemplary embodiments, the determination of the package instance identifiers of the children nodes may be performed in a recursive manner (e.g., performing Steps 130-160 with respect thereto).

On Step 154, a hash value on the list of package instance identifiers may be computed. In some exemplary embodiments, a hash function may be utilized. In some exemplary embodiments, the hash function may be configured to map the list of package instance identifiers (e.g., provided as a text string, as a record of data, an array of strings, or the like), to fixed-size values. In some exemplary embodiments, the hash function may have a statistical property that different list of package instance identifiers are most likely mapped to different hash values. The hash value created based on the list of package instance identifiers of the direct children may be a unique identifier of the sub-tree on which the package depends.

Alternatively, Step 156 may be performed. In case there are no children nodes, the suffix may be a "NULL" value, a NULL string, a predetermined value, such as "leaf" string, or the like.

On Step 160, the package instance identifier may be determined. The package instance identifier may be a concatenation of the prefix determined on Step 140 and the suffix determined either on Step 154 or Step 156. Additionally, or alternatively, the prefix may be concatenated with either the suffix of Step 156 or the list of Step 152, and a hash value may be calculated based thereon to be used as the package instance identifier. It is noted that in such an embodiment, the package instance identifier may not provide any meaningful identification of the package itself, as opposed to a package instance identifier that includes the package name as a prefix thereof.

On Step 170, a lookup may be performed to determine whether the graph includes a package instance that has the package instance identifier. In case, no such package instance identifier exists in the graph, a new package instance node may be created (Step 172) and added to the graph. The package instance node may be updated to include metadata regarding the package instance, a pointer, a reference, or the like to a package node of the respective package (e.g., version 1.1 of package "a"). If no such package node exists, it may be created and updated with the metadata relating to the package (and identical to all package instances thereof).

On Step 174, an edge may be added to the package instance node. The edge may connect a node representing the parent node of the processed package instance. If the parent node may be a package instance node that represents the instance which included the processed package. Additionally, or alternatively, the parent node may be a root node representing the fact that the package is directly introduced by the source code itself.

In some exemplary embodiments, additional packages may be processed, such as by performing Steps 130-174 with respect thereto.

Figure 2:
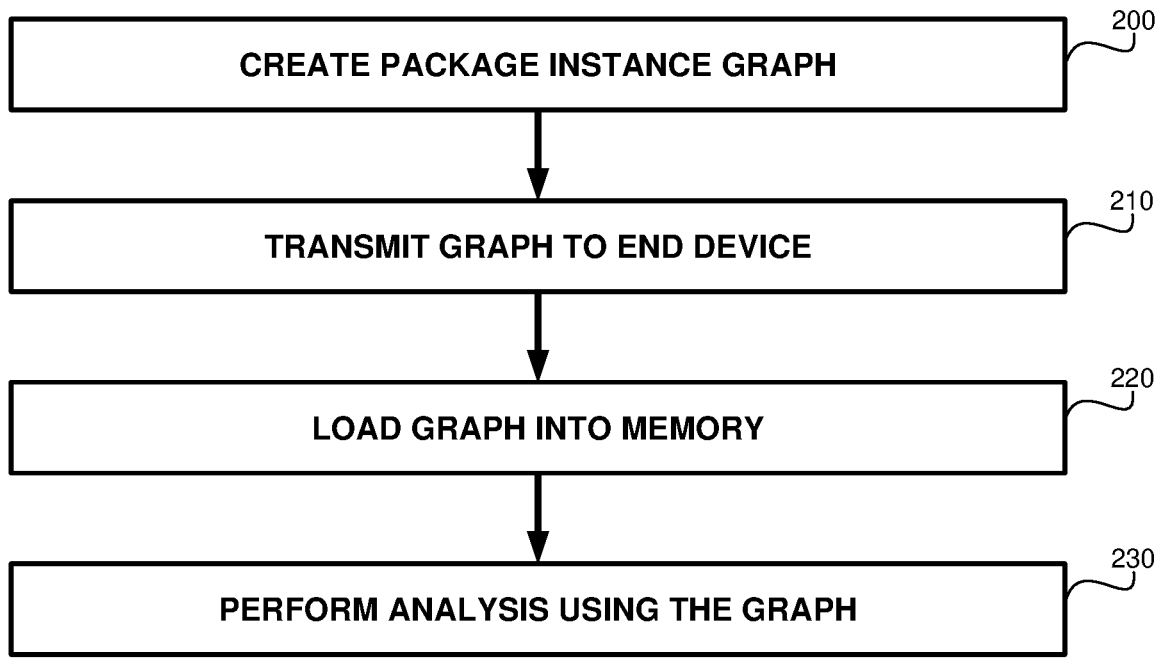
FIG. 2 shows a flowchart diagram of a method, in accordance with some exemplary embodiments of the disclosed subject matter.

Referring now to FIG. 2, showing a flowchart of a method of utilizing a package-instance graph, in accordance with some exemplary embodiments of the disclosed subject matter.

On Step 200, a package instance graph may be created. The package instance graph may be created by a method such as the method illustrated in FIG. 1.

On Step 210, the package instance graph may be transmitted to an end device. In some exemplary embodiments, the graph may be created in one device, such as on a server, and utilized on another device, such as a client device.

On Step 220, the package instance graph may be loaded into the memory of the end device. In some exemplary embodiments, the package instance graph may be loaded into an in-process memory. Due to the limited size of the package instance graph, the graph may be loaded in its entirety into the memory of the process.

On Step 230, the package instance graph may be utilized for analysis. In some exemplary embodiments, a query may be performed on the package instance graph. Additionally, or alternatively, the graph may be queried to obtain a sub-tree thereof, to identify a set of licenses governing the code or portion thereof, identifying vulnerabilities introduced by packages, such as by comparing the existing packages with packages having known vulnerabilities, determining how to fix vulnerabilities, or the like. In some exemplary embodiments, any complex query may be performed on the package instance graph, such as a query to identify how a package is introduced into the code, identifying all sub-trees that include a specific package, performing graph manipulation operations, or the like. In some exemplary embodiments, the package instance graph may be utilized to provide a display to a user, such as a developer.

Figure 3:
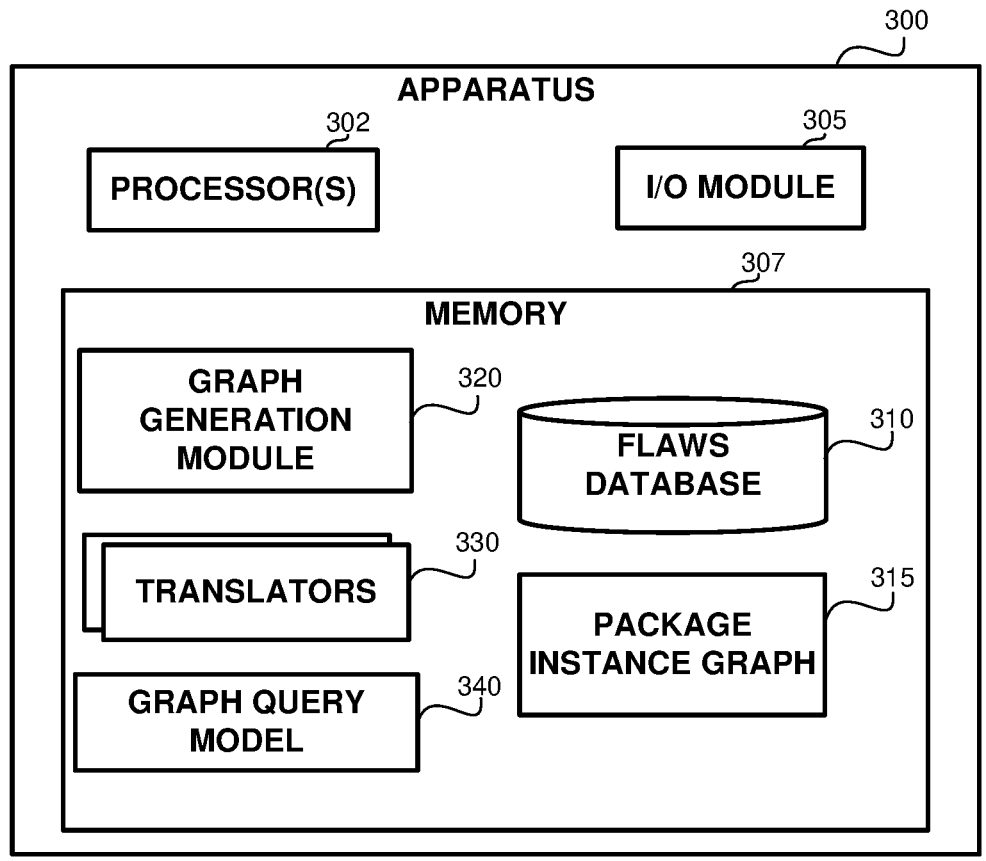
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Memory 307 may retain Flaws Database 310. Additionally, or alternatively, Flaws Database 310 may be retained in a remote storage, such as in a remote datastore (not shown). Flaws Database 310 may retain information regarding known vulnerabilities of packages, and potential mitigating actions to resolve vulnerabilities.

In some exemplary embodiments, Memory 307 may retain Package Instance Graph 315. In some exemplary embodiments, Package Instance Graph 315 may be smaller in size than a complete package tree, while providing an accurate representation thereof. In some exemplary embodiments, Package Instance Graph 315 may be in a size that is sufficiently small to be loaded into an in-process memory, to enable efficient processing.

A Graph Generation Module 320 may be configured to generate Package Instance Graph 315. In some exemplary embodiments, Graph Generation Module 320 may implement the method of FIG. 1. In some exemplary embodiments, Graph Generation Module 320 may select one or more Translators 330 to be utilized for spawning the package tree. In some exemplary embodiments, each Translator 330 may be configured to simulate the operation of a different package manager, so as to implement restrictions and configurations that would be implemented when the source code is processed by the package manager.

A Graph Query Module 340 may be configured to perform queries on Package Instance Graph 315. In some exemplary embodiments, the queries may be aimed at identifying vulnerabilities, such as by locating packages that have known vulnerabilities according to Flaws Database 310. Additionally, or alternatively, the queries may be aimed at identifying all vulnerable instances of the same package to ensure the vulnerabilities are truly removed by mitigating actions. As another example, the queries may be aimed at determining the license that governs over the source code or portion thereof.

Figure 4:
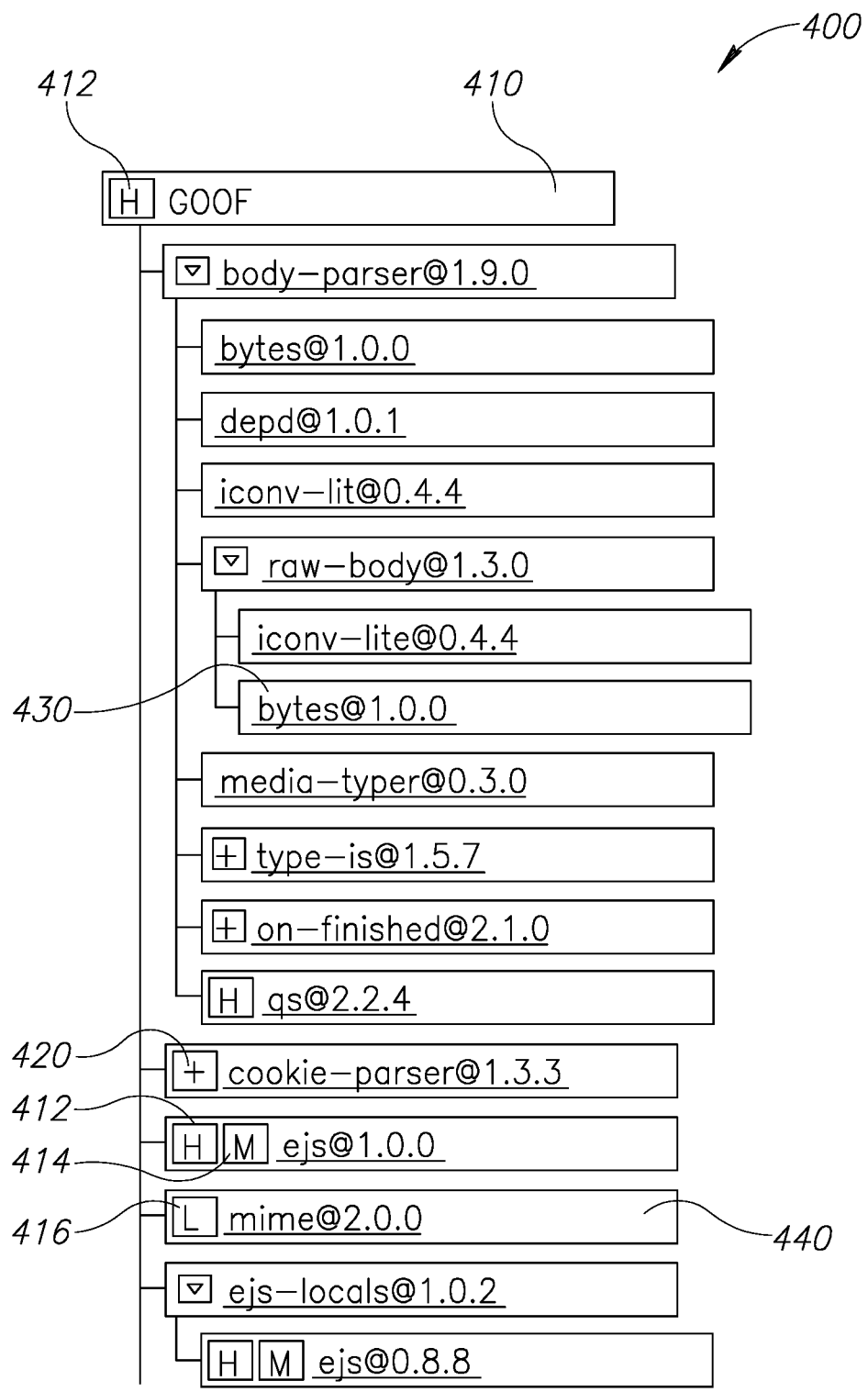
FIG. 4 shows an illustration of a graphical representation of a dependency tree, in accordance with some exemplary embodiments of the subject matter.

Referring now to FIG. 4, showing an illustration of a graphical representation of a dependency tree, in accordance with some exemplary embodiments of the subject matter.

In some exemplary embodiments, the disclosed subject matter may be utilized to visually present to a user a dependency tree. Dependency Tree 400 may be presented on the client side and by the client machine. In some exemplary embodiments, Dependency Tree 400 may be presented without communication with a back-end server, and without requiring connectivity. In some exemplary embodiments, Dependency Tree 400 may be presented to the user in a hierarchical manner, showing some branches in folded manner and others in unfolded manner. The user may select a branch to be unfolded so as to further investigate the dependencies.

In some exemplary embodiments, Dependency Tree 400 may be a graphical representation of a package instance graph that is internally retained.

Module 410, named "goof", with version number 1.9.0, is shown as the root of Dependency Tree 400. The nodes which are the children of the Module 410 are indent to the right. Such nodes may represent packages which the root module, Module 410, "goof", has direct dependency on. Direct dependency may reflect a specific include instruction, import instruction, or the like. As an example, a source file in module "goof" may have a line such as "import "body-parser"". Additionally or alternatively the package "goof" may have a configuration file such as package.json in which there may be a line "cookie-parser@^1.3.3" which indicates that "goof" depends on the package cookie-parser, version at least 1.3.3 but prior to version 2.0.0. As is shown in Dependency Tree 400, Module 410 depends on Module 420, representing that the "goof" package depends on version 1.3.3 of the package "cookie-parser". In some exemplary embodiments, the level of indentation may illustrate levels in the package tree. A package that "goof" depends on indirectly due to depending on another package is shown under a subtree below the direct dependency. As an example, package "goof" depends on "bytes" (430) indirectly, as "goof" depends on "body-parser", which in turn, depends directly on "bytes".

In some exemplary embodiments, visual indications, such as letter coding, color coding, or the like, may represent vulnerability and the vulnerability severity. As an example, "H" (412) may represent high severity, "M" (414) may represent medium severity, and "L" (416) may represent low severity. As an example, package "mime" (440) may have low vulnerability that is introduced to the "goof" module.

It is noted that the graphical user interface may present the package instance graph in a form of a tree, by duplicating a node that is used more than once. Hence, there may be a difference between the internal representation as a graph and the visual display as a tree. Such visual display may have advantages of being more coherent and humans may be more accustomed to such displays.

In some exemplary embodiments, the user may query the client machine to provide a list of all package-instances of a certain package. Each package instance may be retrieved in constant time computational complexity.

Additionally or alternatively, the disclosed subject matter may obtain a package of a package-instance. The package may be identified using the connection between package-instance and package, using an identifier of the package retrievable from the package instance, or the like. The package and information thereof retrieved in constant time computational complexity.

Additionally or alternatively, the user may query and request to obtain all paths in the package-instance graph to a package-instance. The package instance graph may be traversed in opposite direction to the direction of the edges. For example, a Depth First Search (DFS) search may be applied in a reverse order. The traversal may begin at the requested package-instance node. The graph may be traversed until reaching the root of the package-instance graph, which may represent the user code. Each path starting from the package instance node and ending at the root node may represent a dependency path to the package instance. The dependency path may be outputted, such as written or displayed, in a reverse order to the traversed path, representing the dependency order.

In some exemplary embodiments, the user may request to obtain all paths to a package. This may be accomplished by determining the list of package instances of the package in the package instance graph, and for each package instance, determining all paths thereto. The collection of paths to all package instances of the package may thus be obtained.

Additionally or alternatively, the user may query and request to obtain all the direct dependencies which have indirect dependency in a specific package-instance. Traversal from the package instance node towards the root node may be performed. Instead of collecting the entire path, only the direct dependencies of the root may be collected and displayed.

Referring now to FIG. 5A, showing a semantic illustration of a user interface, in accordance with some exemplary embodiments of the subject matter.

FIG. 5A shows a recommendation on how to fix a flaw in the dependencies tree. As illustrated in FIG. 5A, "qs" (510) is a package that has a high severity vulnerability of "prototype override protection bypass". The vulnerability is thus introduced into the project by the dependency, although "qs" is not a direct dependence of the project. As is illustrated, the vulnerability is introduced by three different paths (515). A detailed path and remediation section (520) shows the different paths to different "qs" packages having the vulnerability (version 1.2.2, version 2.4.2, and version 2.2.4).

FIG. 5A shows that when applicable, a remediation advice is offered, to remove the vulnerability from the project. As an example, the instance that is introduced by "express" package (Path 524*a*) introduces a vulnerability that can be remediated. A Remediation Advice 524*b* suggesting that "express" may be upgrade from version 4.12.4 to version 4.15.2 is offered. As another example, for some instances, such as the instance introduced by "request" package (Path 522*a*), there may not be any remediation advice (522*b*).

In some exemplary embodiments, an Automated Fix 530 is provided. The user may interact with Automated Fix 530 to automatically implement the remediation advices.

Referring now to FIG. 5B showing a semantic illustration of a user interface, in accordance with some exemplary embodiments of the subject matter. Interface 550 may be a command line interface. Interface 550 shows that package "negotiator" has a severe vulnerability. The vulnerability may be described as "Regular Expression Denial of Service (DOS)". The alternative vulnerable paths to the vulnerable versions of the "negotiator" package may be shown with a "From" label. In the illustrated example, the vulnerability is introduced in package "errorhandler", version 1.2.0. "errorhandler" depends on package "accept", version 1.1.4, which in turn depends on the vulnerable package, "negotiator", version 0.4.9. Remediation may be offered by upgrading package "errorhandler", version 1.2.0 to version 1.4.3. An upgrade may trigger package "negotiator" to be upgraded to version 0.6.1. The vulnerability may also be introduced via package "express", version 4.12.4, which depends on package "accept", version 1.2.13 which in turn depends on package "negotiator", version 0.5.3. Such vulnerable path may be remediated by upgrading the direct dependency of "express" to version 4.14.0. A third vulnerable path is introduced by the direct dependency "st", version 0.2.4, which depends on package "negotiator", version 0.2.8. Such vulnerable path may be remediated by upgrading direct dependency "st" to version 1.1.0.

It is noted that both interfaces of FIGS. 5A and 5B may be used on a client machine without requiring connectivity with a backend server. Additionally or alternatively, vulnerability may be retained in a remote database retaining all known vulnerabilities. The instance-package graph may be constructed locally on the client machine without requiring connectivity. Aside from querying the remote database for vulnerable packages in the project, all processing may be performed locally on the client machine and without requiring connectivity.

Figure 6A:
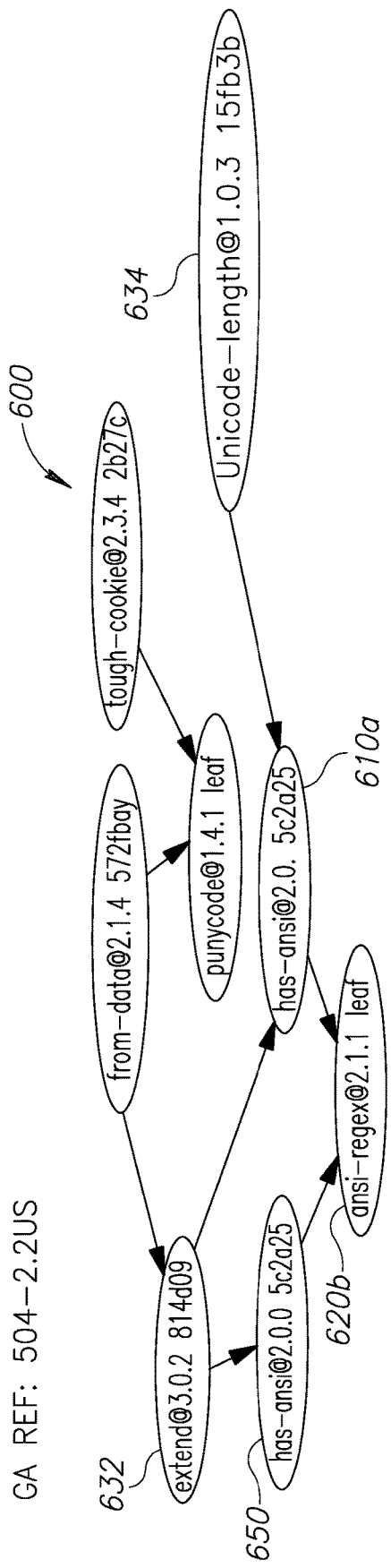
FIGS. 6A-6B show semantic illustrations of portions of a package instance graph, in accordance with some exemplary embodiments of the subject matter.
Figure 6B:
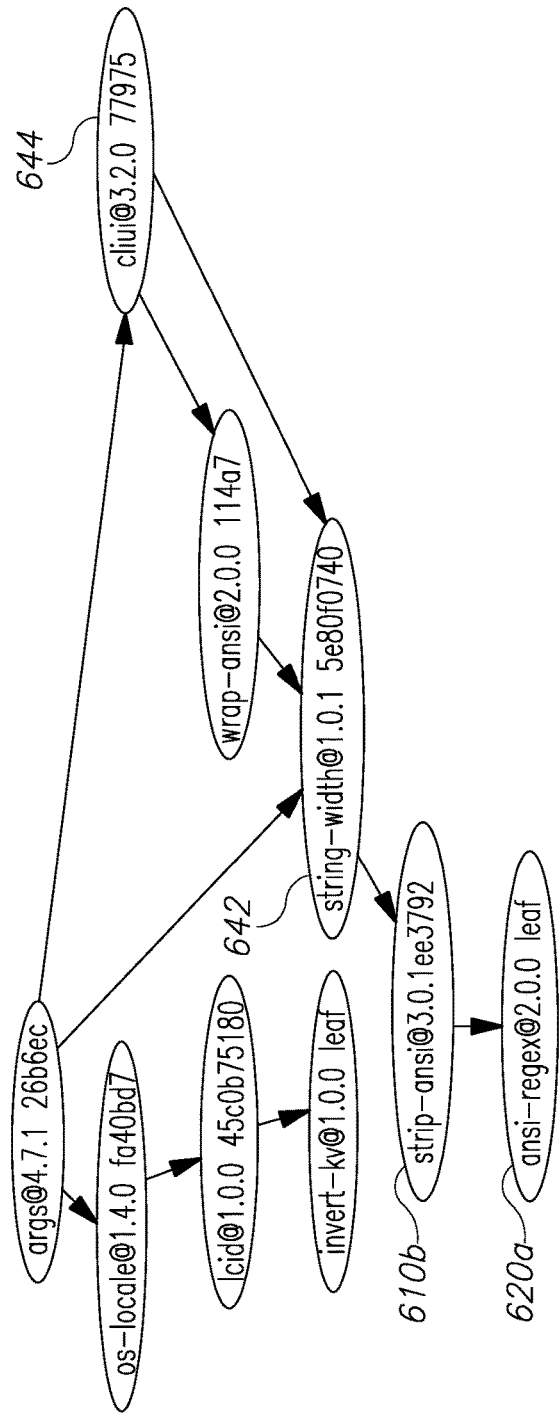

Referring now to FIGS. 6A-6B, showing semantic illustrations of portions of a package instance graph, in accordance with some exemplary embodiments of the subject matter.

FIGS. 6A and 6B show a different package instance for the same package, "strip-ansi@3.0.1". In FIG. 6A, Node 610*a* represents an instance of the package "strip-ansi@3.0.1" that depends on Node 620*a*, representing package "ansi-regex@2.1.1". In FIG. 6B, Node 610*b* represents an instance of package "strip-ansi@3.0.1" that depends on Node 620*b*, representing "ansi-regex@1.0.0". Put differently, Node 610*a* and 610*b* represent different instances of the same package. As can be appreciated, the two different package instances differ in their dependency subtrees.

Although both package instances relate to the same version, they depend on different versions of "ansi-regex".

It is also noted that Node 620*a* is used twice in the package instance graph. Both Nodes 610*a* and 650 depend on Node 620*a*. As Node 620*a* does not depend on other packages, its name includes the suffix "leaf". Node 610*a*, on the other hand has a non-empty dependency tree. The hash value of all the package instance identifiers of the direct children is used to determine the suffix of the package instance identifier of Node 610*a*. As can also be appreciated, as Node 650 has the same dependency sub-tree, it also shares the same suffix as Node 610*a*.

Each package instance of "strip-ansi" shown in FIGS. 6A and 6B are used twice in the package instance graph (i.e., Nodes 632, 634 depend on Node 610*a*, and Nodes 642, 644 depend on Node 610*b*). As can be appreciated, if instead of package instances, the graph was constructed out of packages, it would either be incorrect or comprise duplicate copies of subtrees. For example, if a tree structure was used instead of a graph, each package instance would have been duplicated, together with its dependency subtree. As another example, if a Directed Acyclic Graph (DAG) of packages was used, the package "strip-ansi@3.0.1" would have been used in four different places, and its single dependency subtree would have been incorrect in 2 out of the 4 uses.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium retaining program instructions, which program instructions when read by a processor, cause the processor to perform a method for building a data structure,
wherein the data structure representing package dependencies in a computer program, the data structure comprises: a set of package instance nodes and a set of edges connecting package instance nodes of the set of package instance nodes;
wherein the method comprising, repeatedly performing for a package to be processed:
determining a package instance identifier of the package to be processed, wherein said determining the package instance identifier comprises:
obtaining a unique identifier of the package to be processed;
obtaining a unique identifier of a dependency sub-tree of the package to be processed in the package instance identifier; and
determining the package instance identifier based on the unique identifier of the package to be processed and on the unique identifier of a dependency sub-tree of the package to be processed;
in response to a determination that the set of package instance nodes does not comprise a node representing the package to be processed, creating the node and adding the node to the set of package instance nodes, wherein the determination whether the set of package instance nodes comprises the node is performed using the package instance identifier; and
in case that the dependency sub-tree of the package to be processed is not empty, adding to the set of edges one or more edges representing dependency relationship between the node representing the package to be processed and one or more nodes in the dependency sub-tree of the package to be processed.

2. The computer program product of claim 1, wherein said obtaining the unique identifier of the dependency sub-tree of the package to be processed comprises:
obtaining a package instance identifier of each package on which the package to be processed directly depends, whereby obtaining a list of package instance identifiers representing the dependency sub-tree; and
computing a hash value on the list of package instance identifiers representing the dependency sub-tree to obtain the unique identifier of the dependency sub-tree.

3. The computer program product of claim 1, wherein an empty dependency sub-tree has a constant predetermined identifier.

4. The computer program product of claim 1, wherein the method further comprises:
selecting a translator to simulate a package manager that is applied on the computer program; and
utilizing the translator to determine one or more direct dependencies of the package to be processed.

5. The computer program product of claim 1, wherein the method further comprises:
in response to said creating the node, determining whether a package record for the package to be processed exists;
in response to a determination that the package record for the package to be processed does not exist, creating the package record and retaining metadata information regarding the package to be processed that is consistent for different instances thereof in the package record;
connecting the node to the package record; and
retaining in the node metadata information that is potentially inconsistent for different instances of the package to be processed.

6. The computer program product of claim 1,
wherein each package instance node represents a different instance of a code package, wherein each package instance node comprising a package instance identifier and an instance metadata, wherein the package instance identifier is a unique identifier in the set of package instance nodes, wherein the instance metadata comprise a reference to a package record, wherein the package record representing a package, wherein the instance package is an instance of the package;
wherein the set of package instance nodes comprise at least two package instance nodes that represent different instances of a same package;
wherein an edge from a source node to a target node represents a dependency relationship of a package represented by the source node on a package represented by the target node; and wherein the data structure forming a directed acyclic graph representing a package dependency tree.

7. A method for building a data structure, the data structure representing package dependencies in a computer program, the data structure comprises: a set of package instance nodes and a set of edges connecting package instance nodes of the set of package instance nodes;
wherein the method comprising, repeatedly performing for a package to be processed:
determining a package instance identifier of the package to be processed, wherein said determining the package instance identifier comprises:
obtaining a unique identifier of the package to be processed;
obtaining a unique identifier of a dependency sub-tree of the package to be processed in the package instance identifier; and
determining the package instance identifier based on the unique identifier of the package to be processed and on the unique identifier of a dependency sub-tree of the package to be processed;
in response to a determination that the set of package instance nodes does not comprise a node representing the package to be processed, creating the node and adding the node to the set of package instance nodes, wherein the determination whether the set of package instance nodes comprises the node is performed using the package instance identifier; and
in case that the dependency sub-tree of the package to be processed is not empty, adding to the set of edges one or more edges representing dependency relationship between the node representing the package to be processed and one or more nodes in the dependency sub-tree of the package to be processed.

8. The method of claim 7, wherein said obtaining the unique identifier of the dependency sub-tree of the package to be processed comprises:
obtaining a package instance identifier of each package on which the package to be processed directly depends, whereby obtaining a list of package instance identifiers representing the dependency sub-tree; and
computing a hash value on the list of package instance identifiers representing the dependency sub-tree to obtain the unique identifier of the dependency sub-tree.

9. The method of claim 7, wherein an empty dependency sub-tree has a constant predetermined identifier.

10. The method of claim 7 further comprises:
selecting a translator to simulate a package manager that is applied on the computer program; and
utilizing the translator to determine one or more direct dependencies of the package to be processed.

11. The method of claim 7 further comprises:
in response to said creating the node, determining whether a package record for the package to be processed exists;
in response to a determination that the package record for the package to be processed does not exist, creating the package record and retaining metadata information regarding the package to be processed that is consistent for different instances thereof in the package record;
connecting the node to the package record; and
retaining in the node metadata information that is potentially inconsistent for different instances of the package to be processed.

12. The method of claim 7,
wherein each package instance node represents a different instance of a code package, wherein each package instance node comprising a package instance identifier and an instance metadata, wherein the package instance identifier is a unique identifier in the set of package instance nodes, wherein the instance metadata comprise a reference to a package record, wherein the package record representing a package, wherein the instance package is an instance of the package;
wherein the set of package instance nodes comprise at least two package instance nodes that represent different instances of a same package;
wherein an edge from a source node to a target node represents a dependency relationship of a package represented by the source node on a package represented by the target node; and
wherein the data structure forming a directed acyclic graph representing a package dependency tree.

13. An apparatus configured for building a data structure, the data structure representing package dependencies in a computer program, the data structure comprises: a set of package instance nodes and a set of edges connecting package instance nodes of the set of package instance nodes;
said apparatus comprises a processor and a data storage, wherein the data storage is configured to retain the data structure,
wherein said processor is configured to repeatedly perform for a package to be processed:
determining a package instance identifier of the package to be processed, wherein said determining the package instance identifier comprises:
obtaining a unique identifier of the package to be processed;
obtaining a unique identifier of a dependency sub-tree of the package to be processed in the package instance identifier; and
determining the package instance identifier based on the unique identifier of the package to be processed and on the unique identifier of a dependency sub-tree of the package to be processed;
in response to a determination that the set of package instance nodes does not comprise a node representing the package to be processed, creating the node and adding the node to the set of package instance nodes, wherein the determination whether the set of package instance nodes comprises the node is performed using the package instance identifier; and
in case that the dependency sub-tree of the package to be processed is not empty, adding to the set of edges one or more edges representing dependency relationship between the node representing the package to be processed and one or more nodes in the dependency sub-tree of the package to be processed.

14. The apparatus of claim 13, wherein said obtaining the unique identifier of the dependency sub-tree of the package to be processed comprises:
obtaining a package instance identifier of each package on which the package to be processed directly depends, whereby obtaining a list of package instance identifiers representing the dependency sub-tree; and
computing a hash value on the list of package instance identifiers representing the dependency sub-tree to obtain the unique identifier of the dependency sub-tree.

15. The apparatus of claim 13, wherein an empty dependency sub-tree has a constant predetermined identifier.

16. The apparatus of claim 13, wherein said processor is further configured to perform:
selecting a translator to simulate a package manager that is applied on the computer program; and utilizing the translator to determine one or more direct dependencies of the package to be processed.

17. The apparatus of claim 13, wherein said processor is further configured to perform:
in response to said creating the node, determining whether a package record for the package to be processed exists;
in response to a determination that the package record for the package to be processed does not exist, creating the package record and retaining metadata information regarding the package to be processed that is consistent for different instances thereof in the package record;
connecting the node to the package record; and
retaining in the node metadata information that is potentially inconsistent for different instances of the package to be processed.

18. The apparatus of claim 13,
wherein each package instance node represents a different instance of a code package, wherein each package instance node comprising a package instance identifier and an instance metadata, wherein the package instance identifier is a unique identifier in the set of package instance nodes, wherein the instance metadata comprise a reference to a package record, wherein the package record representing a package, wherein the instance package is an instance of the package;
wherein the set of package instance nodes comprise at least two package instance nodes that represent different instances of a same package;
wherein an edge from a source node to a target node represents a dependency relationship of a package represented by the source node on a package represented by the target node; and
wherein the data structure forming a directed acyclic graph representing a package dependency tree.

* * * * *